Jan. 14, 1969   J. D. KOKERNOOT   3,421,592
MILK WEIGHING MACHINE
Filed July 14, 1966   Sheet 1 of 6
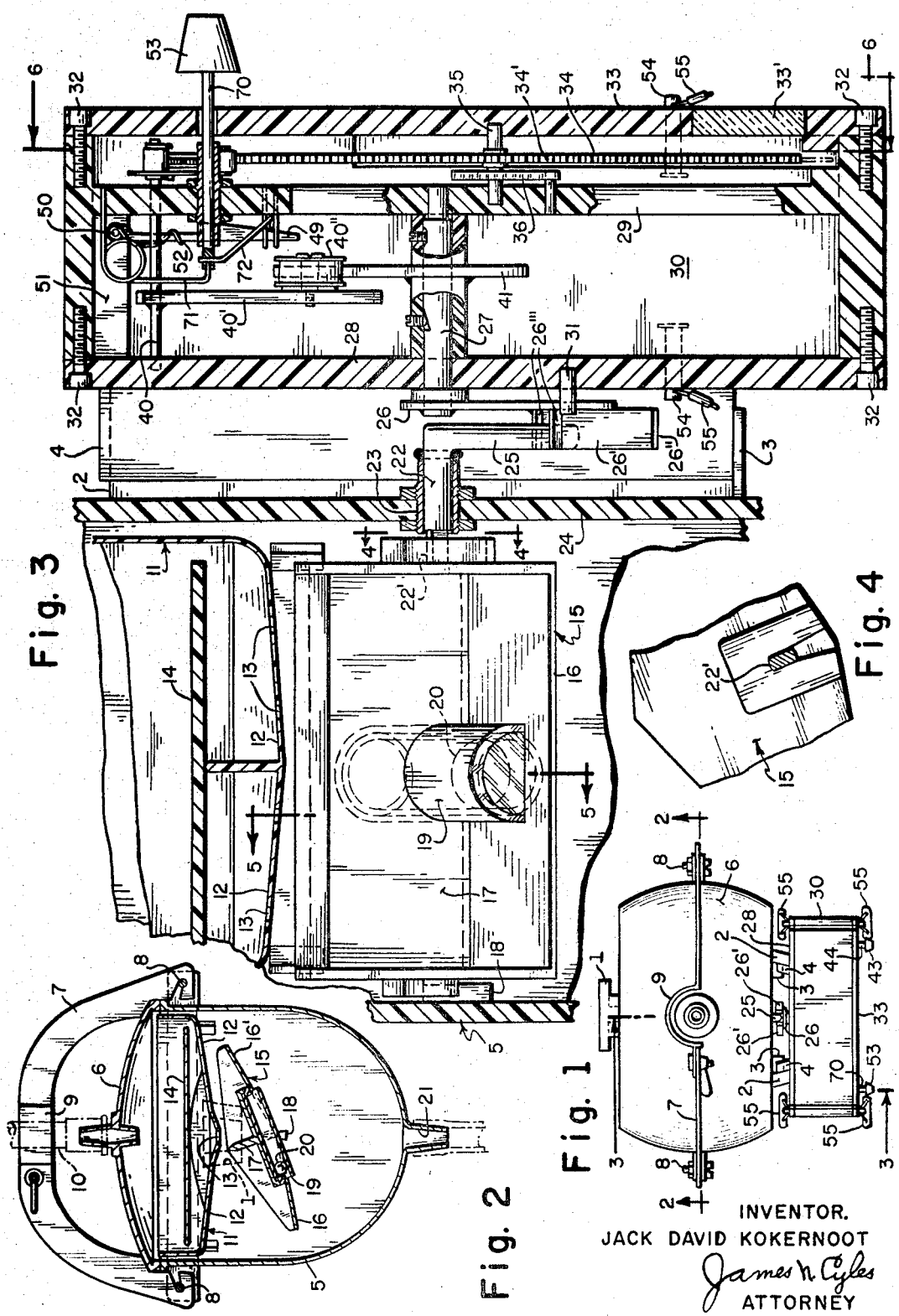
INVENTOR.
JACK DAVID KOKERNOOT
James N. Cyles
ATTORNEY Jan. 14, 1969 J. D. KOKERNOOT 3,421,592
MILK WEIGHING MACHINE
Filed July 14, 1966 Sheet 2 of 6

INVENTOR.
JACK DAVID KOKERNOOT
ATTORNEY

INVENTOR.
JACK DAVID KOKERNOOT

James H. Cyles
ATTORNEY

Jan. 14, 1969 J. D. KOKERNOOT 3,421,592
MILK WEIGHING MACHINE
Filed July 14, 1966 Sheet 4 of 6
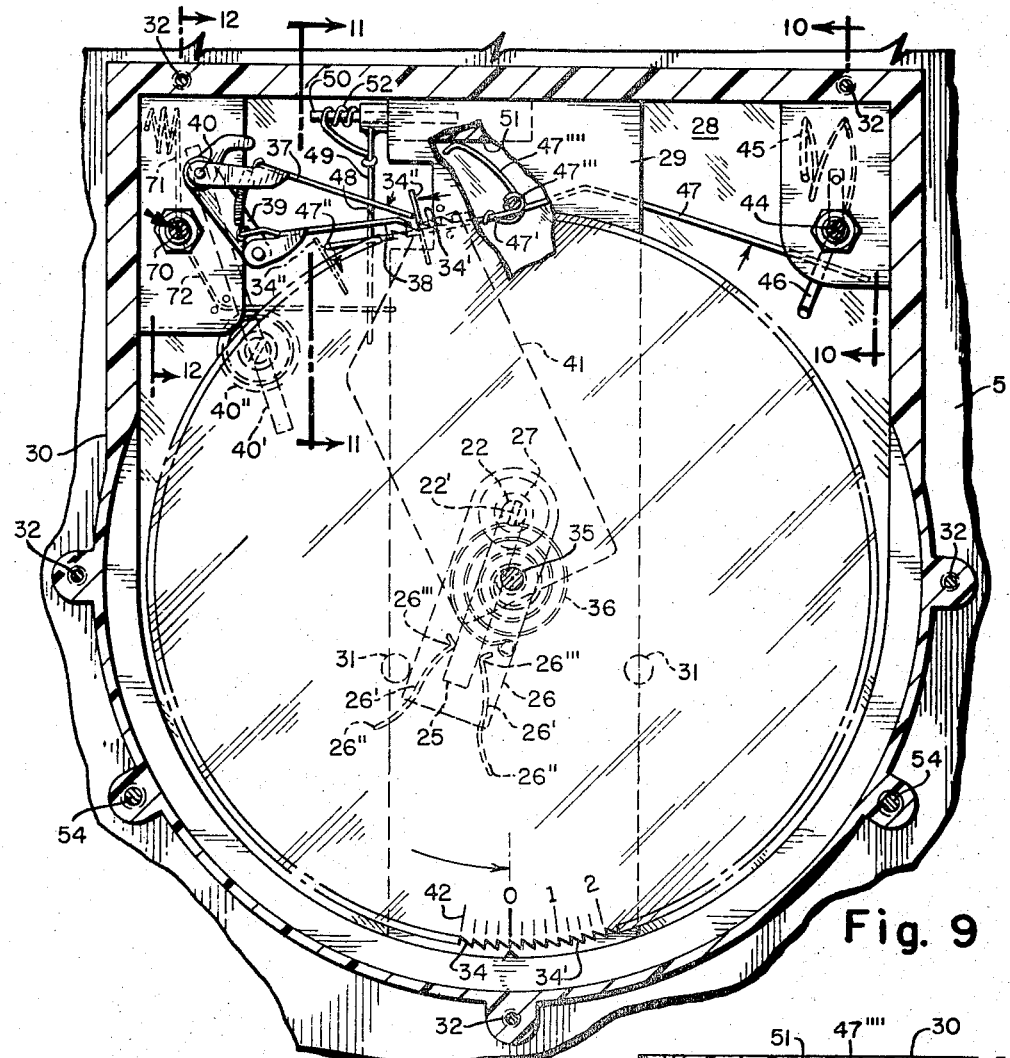
Fig. 9
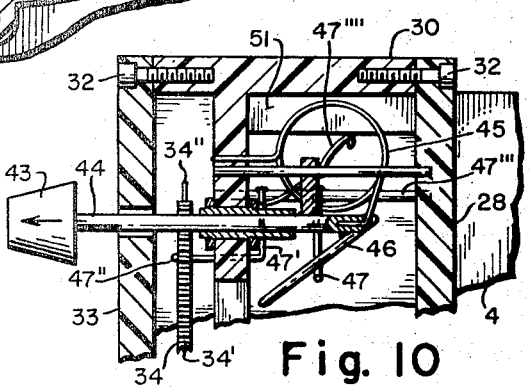
Fig. 11
Fig. 10
INVENTOR.
JACK DAVID KOKERNOOT
James N. Cyles
ATTORNEY

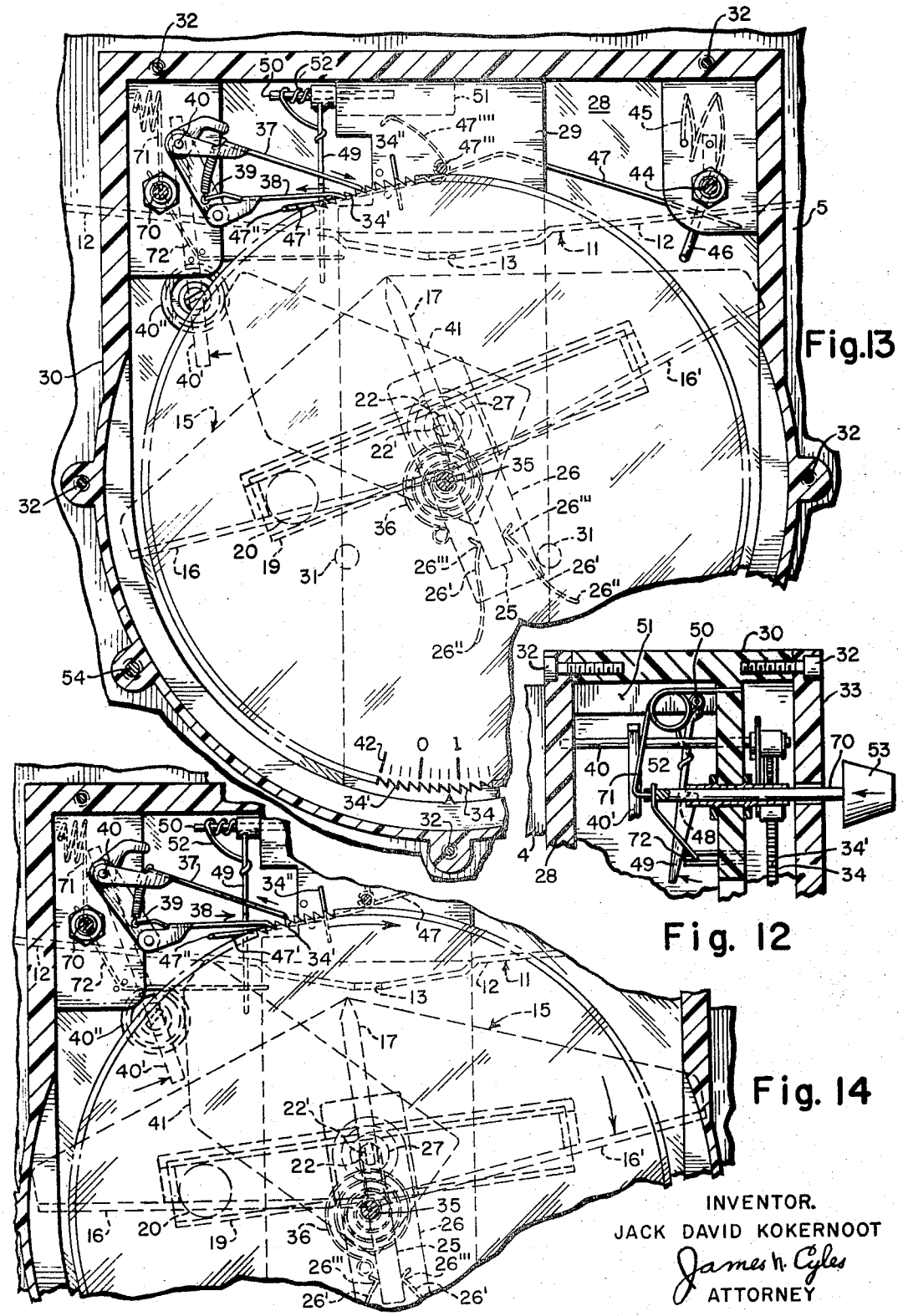

United States Patent Office 3,421,592
Patented Jan. 14, 1969

3,421,592
MILK WEIGHING MACHINE
Jack David Kokernoot, 3141 SW. 18th St.,
Fort Lauderdale, Fla. 33312
Filed July 14, 1966, Ser. No. 565,198
U.S. Cl. 177—24          7 Claims
Int. Cl. G04g 19/40

ABSTRACT OF THE DISCLOSURE

A milk weighing machine including a rockable dump pan having two chambers and supported on a fulcrum in a bowl, the pan having a cylindrical passage in which a ball is rollable to opposite sides of the fulcrum so that the pan will not be rocked by milk flowing into one chamber until the ball is overbalanced, after which the pan rocks and the ball rolls to the other side of the fulcrum. A registering means operated by the pan is completely separately housed so that the bowl and pan can be immersed for cleaning without affecting the registering means. The registering means counts the increments of weight measured by the dump pan and indicates the accumulated weight. Different types of registering means are disclosed including a mechanical type, a pneumatic type and an electrical type.

---

This invention relates to a weighing device for weighing fluids, such as milk, and contemplates a counting mechanism that is actuated by a balanced pan that receives the milk from a milking machine under a vacuum and whereby the counter mechanism is caused to rotate in a step by step manner and with the number of ounces being indicated through a transparent closure for the counter mechanism and with means whereby the counter mechanism is caused to rotate in an opposite direction when a single cow has been milked.

The invention contemplates the receiving bowl, having an outlet opening in its bottom that is disposed directly over a balanced pan that is provided with two compartments and means on the pan to cause an overbalance thereof when each compartment has been filled and to dump the contents thereof into a receiving bowl that is connected at its bottom with a discharge tube and with the pan being fulcrumed in the bowl and having a shaft extending outwardly from the bowl to impart a motion to a disk within a plastic housing that is supported upon the outer side of the bowl and with the disk being provided with ounce graduations around its circumference.

Novel features of construction and operation of the device will be more clearly apparent during the course of the following description and with reference being had to the accompanying drawings, wherein has been illustrated preferred forms of the device and wherein like characters of reference are employed to denote like parts throughout the several figures.

Figure 15:
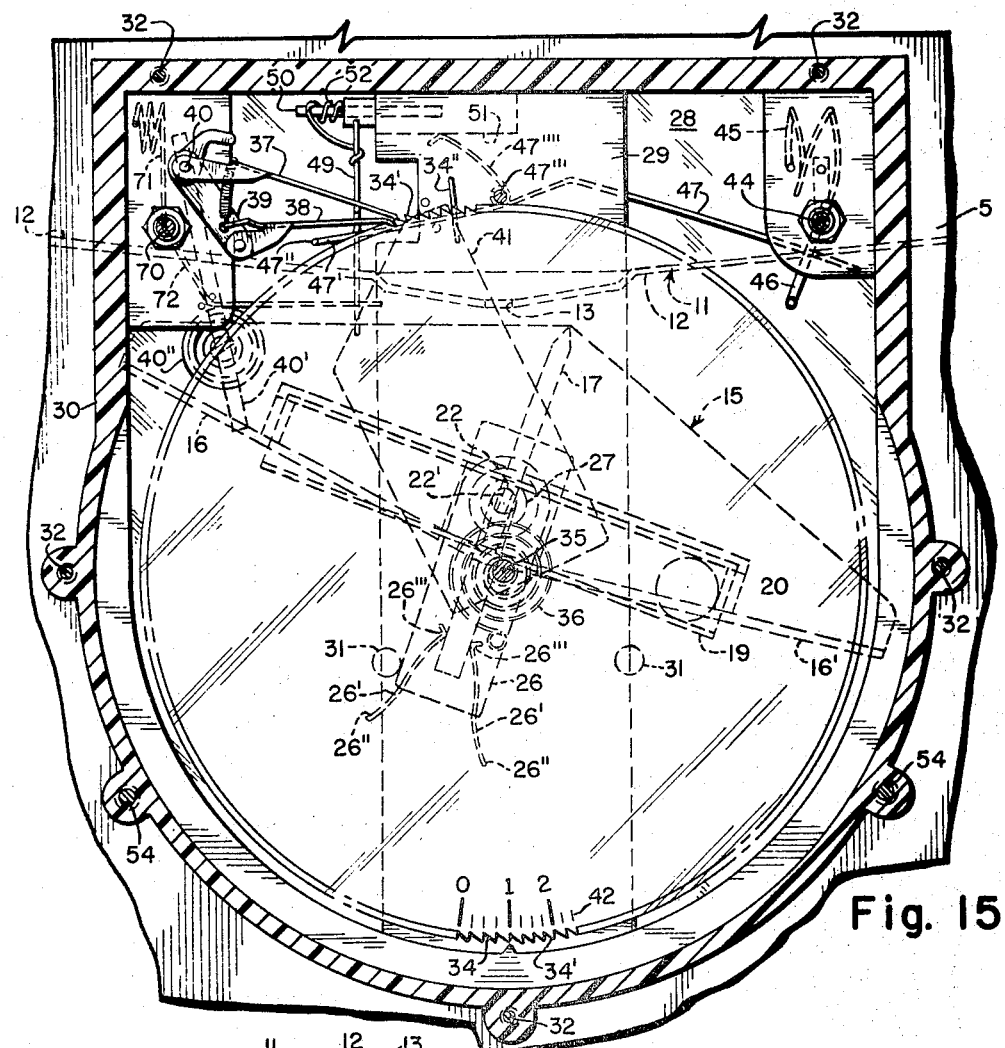
Figure 5:
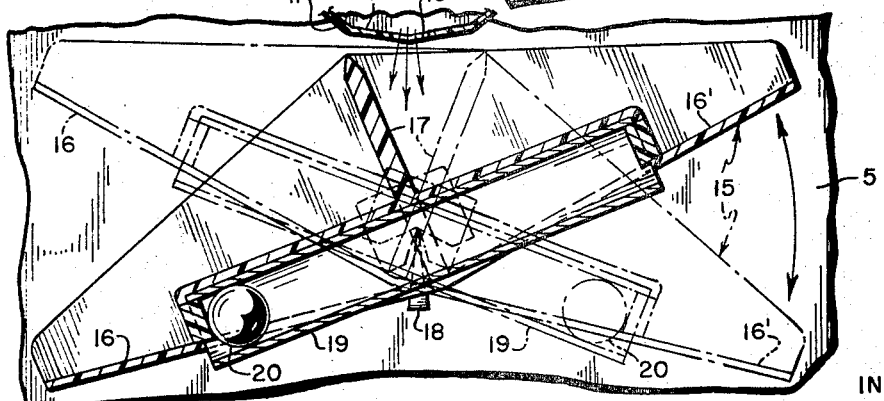
Figure 6:
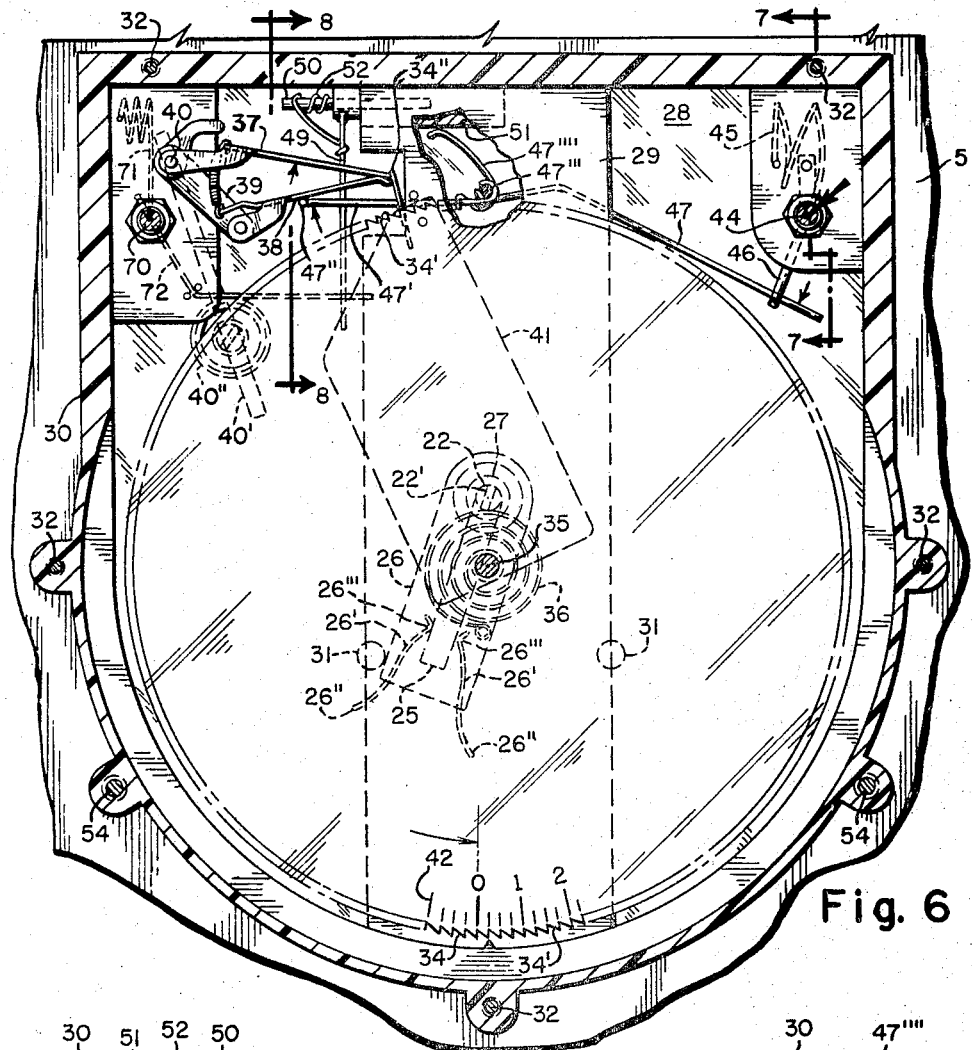
Figure 8:
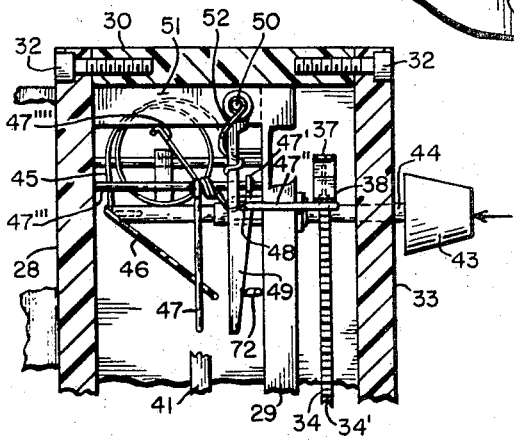
Figure 7:
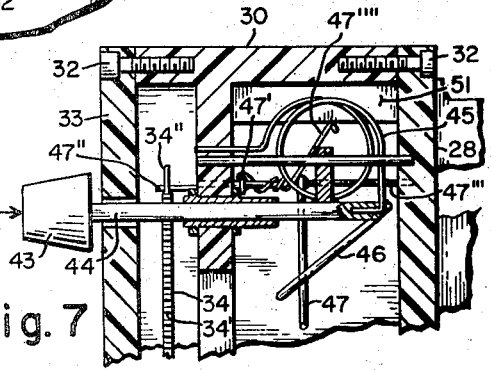
Figure 16:
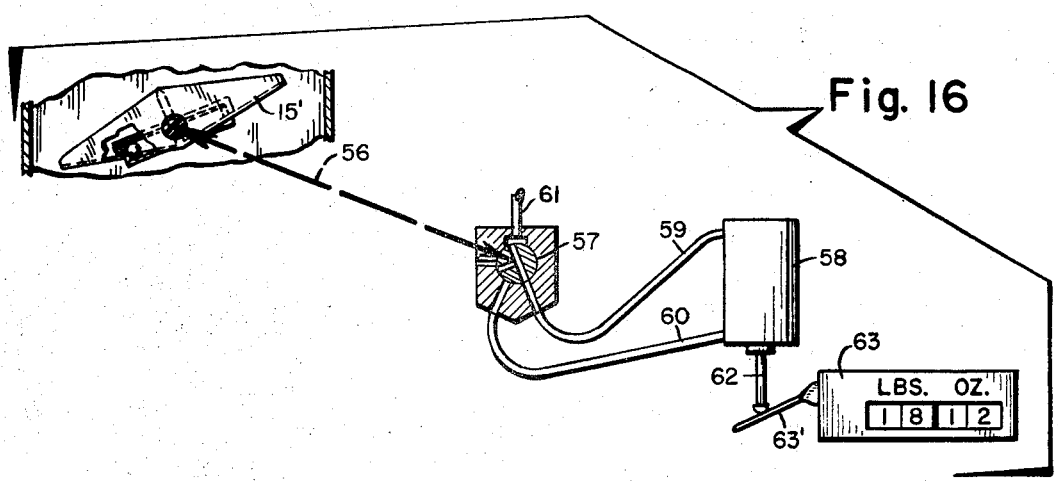
Figure 17:
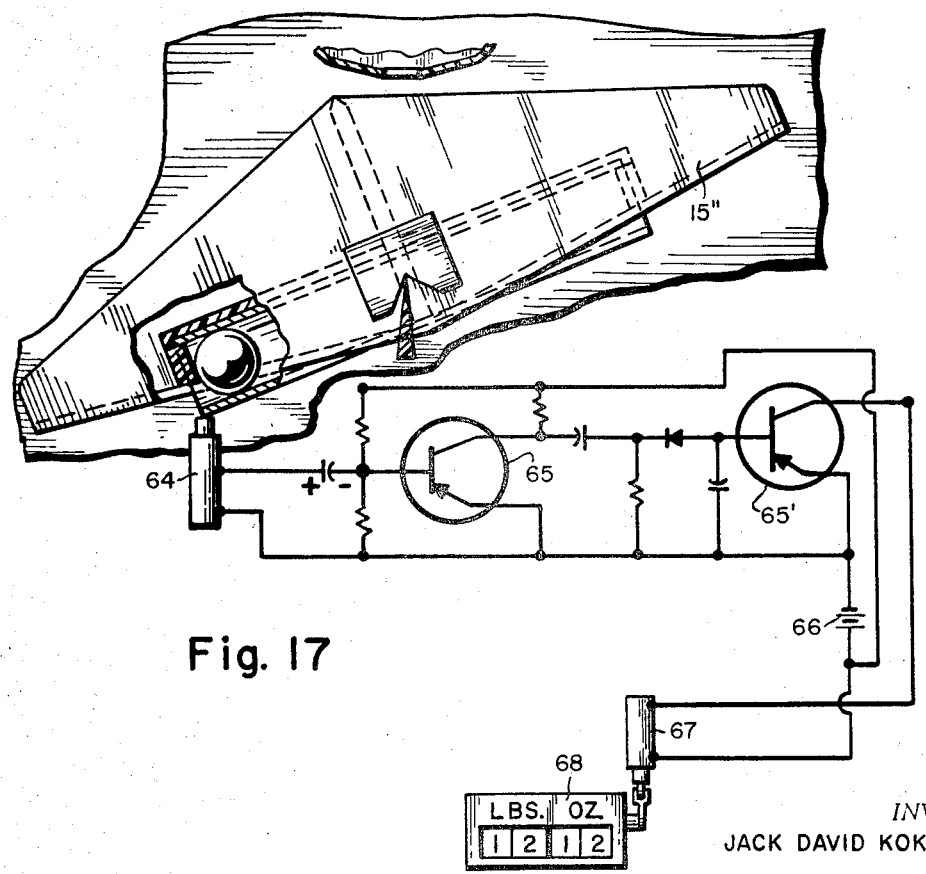

In the drawings:
FIGURE 1 is a top plan view of the device,
FIGURE 2 is a vertical sectional view taken on line 2—2 of FIGURE 1,
FIGURE 3 is a longitudinal section taken on line 3—3 of FIGURE 2, parts being broken away,
FIGURE 4 is a fragmentary section taken substantially on line 4—4 of FIGURE 3,
FIGURE 5 is a section taken substantially on line 5—5 of FIGURE 3,
FIGURE 6 is a section taken substantially on line 6—6 of FIGURE 3,
FIGURE 7 is a fragmentary section taken substantially on line 7—7 of FIGURE 6,
FIGURE 8 is a fragmentary section taken substantially on line 8—8 of FIGURE 6,
FIGURE 9 is a view similar to FIGURE 6 but showing the mechanism in a slightly different position,
FIGURE 10 is a fragmentary section taken substantially on line 11—11 of FIGURE 9,
FIGURE 12 is a fragmentary section taken substantially on line 12—12 of FIGURE 9,
FIGURE 13 is a view similar to FIGURES 6 and 9, showing the parts in a slightly different position,
FIGURE 14 is a fragmentary section similar to FIGURE 13, showing the parts in a slightly different position,
FIGURE 15 is a view similar to FIGURE 12 but the parts being moved to a different position,
FIGURE 16 is an exploded diagrammatic view illustrating a slightly modified counter mechanism, and
FIGURE 17 is a further modified view illustrating an electric counter mechanism.

Referring specifically to the drawings and particularly FIGURE 2 there has been illustrated a bowl 5 open at its top and closed and sealed by a cover 6. The cover 6 is held in sealed relation to the bowl 5 by a handle 7, that is hooked at its opposite ends to pins 8. The handle 7 is arcuately formed intermediate its ends as indicated at 9 to form a clearance for a flexible pipe 10, leading to the milking device and communicating with the interior of the bowl. The bowl at its upper portion is provided with a drip receptacle 11, having an incline bottom 12 that is apertured at 13. The receptacle 12 is provided with a horizontally arranged diffuser plate 14 whereby to prevent milk from the tube 10 dropping directly to the aperture 13 of the plate 14 causing the milk to run over its edges to fall downwardly to the bottom of the receptacle. Hingedly disposed within the bowl 5 and directly beneath the aperture 13 is a weighing tray 15 having inclined end portions 16 and a centrally arranged partition 17. The tray 15 is supported at one end by engagement with wedge shaped bearing member 18 and the tray is provided with a tubular housing 19, closed at its opposite ends and adapted to receive a weighted ball 20. As the milk enters the upper compartment of the tray 15, the tray will be overbalanced and will pivot so that the ball will roll to the lower end of the housing 19 and to dump the accumulated milk into the bowl 5. The bowl 5 is provided with the spout 21 at its lower end through which the milk is discharged to a suitable container. The tray 15 is also provided with a shaft 22, rotatable within a bearing 23 in the front wall 24 of the bowl 5. The shaft 22 at its outer end is provided with a crank arm 25 that rockably engages a flat plate 26, fixed to a shaft 27 that is journaled in bearings carried by the rear wall 28 and a partition wall 29, in a housing 30. In the wall 28, there is provided stops 31, that project rearwardly of the wall 28 and that lie in the path of movement of the plate 26.

The housing 30 is open upon its forward side and is normally covered by a plate, preferably formed of plastic, shown at 33 and secured to the housing 30 by screw threaded fastening devices 32. The plate 33 is molded with a magnifying lens 33' so that a person examining a device may have no difficulty in reading the accumulated weight upon a plastic disc 34, that is rotatable upon a shaft 35 and with the shaft and the disc 34 being biased in one direction by coil spring 36. The disc 34 is provided around its entire circumference with ratchet teeth 34'. The ratchet teeth 34' are engaged by a pair of pawls 37 and 38, with the pawl 38 serving as a driving pawl for the teeth 36 while the pawl 37 merely engages the teeth to prevent a reverse movement. The pawls are connected to a rocker arm 39 pivotally supported upon a shaft 40. The pawls are shifted to a position away from the teeth 34' by a cam 41, fixed upon the shaft 27 and moving under the influence of the rocking movement of the tray 15. When the pawl is moved in an opposite direction by tray 15, the pawls will engage the teeth 34' and drive the disc 34 in a clockwise direction and in a direction to wind the spring 36. The marginal face of the disc 34 is provided with graduations 42, that are in ounces and fractions of ounces and the numerals will be moved forward by one tooth at each movement of the weighted tray, thus indicating through the lens 33' the weight of each amount of fluid dumped each time the weighing tray trips. After a certain batch or lot of fluid is weighed, the dial gear is reset to zero for the start of a new batch or lot. This is accomplished by pushing upon a reset button 43, moving a rod 44 rearwardly against the tension of a partially coiled spring 45. The rod 44 at its inner end carries a diagonal rod 46, that overrides a trip wire 47 that forms a lever that extends to and underlies the pawl 38 when the rod 46 rides upon the reset wire 47, the opposite end of the wire lifts the pawls upwardly. The wire 47 normally engages a shoulder 48 carried by a depending arm 49 that is pivotally supported at 50 through a rib 51 that is molded integral with the housing 30. Arm 49 is biased in a forward direction by spring 52 and, when the reset button 43 is actuated, the pawls 37 and 38 are lifted out of engagement with the teeth 34' and the disc 34 then rotates to a zero position by the spring 36. A start button 53 is then shoved inwardly, releasing the wire 47 from the shoulder 48 and permitting the pawls to drop downwardly into engagement with the teeth 34'. Now, when the tray is actuated by the milk filling and dumping, the pawls will cause the disc 34 to rotate in a clockwise direction. The arm 49 is swung rearwardly to release the wire 47 and, when the start button 53 is shoved in, the pawls are released and dropped into the teeth 34' of the gear thus preparing the meter for another batch or load of weighing.

The wall 28 and the cover 33 engage pins 54, that are molded into the plastic housing 30 and are apertured at the outer ends to receive seals 55, whereby to prevent anyone from removing the cover or the back plate to change the reading upon the disc 34.

In FIGURE 16, there has been illustrated a somewhat modified form of counting device. Here, the same tray 15' drives a shaft 56, that rotates a three-way valve 57, including a pump 58 and with air lines 59 and 60, leading from the opposite ends of the pump 58, to the three-way valve 57. The valve 57 is also connected to the vacuum line and to a pipe 61. It will be apparent that as the tray 15' is oscillated, vacuum will be admitted to alternate ends of the pump 58 by the rocking movement of valve 57 and a valve stem 62 bears against an arm 63' of a counter device 63. As the pump is moved, the stem 62 alternately presses the arm 63' downwardly to actuate the conventional counter dials.

As shown in FIGURE 17, the tray 15'' alternately bumps against a sensing coil 64 and through suitable electrical wiring, including transistors 65 and 65' a source of energy 66 functions to energize a coil 67 for each of the rocking motions of the tray 15'' whereby to actuate a conventional counter 68.

Referring to FIGURES 1, 2, 3 and 6, male dovetail 1 extends from rear wall of bowl 5 for mounting to mating slide on milling apparatus not shown. Extensions 2 form a gib on front wall 24 of bowl 5 to receive the extensions 4 from the rear wall 28 in a snug sliding fit as shown in FIGURES 1 and 3. The lower portions of extensions 4 rest on the top surface of horizontal stops 3. This slide assembly secures the counter mechanism to bowl 5. Referring to FIGURES 3 and 6, extensions 26' are bell mouthed at lower ends 26'' to provide clearance for crank arm 25. This clearance formed by extensions 26' allows the upper ends 26''' of extensions 26' to self-align about crank arm 25 into a snug fit position as shown in FIGURES 3 and 6.

Referring to FIGURES 6 and 9, right angle extension 47'' of trip wire 47' acts as a stop for the pin 34'' which has rotated clockwise to the position shown by dotted line. This position shows the maximum travel of the dial and will necessitate a manual clearance of the dial. This is accomplished by a pushing upon a reset button 43 moving a rod 44 rearwardly against the tension of a partially coiled spring 45. The rod 44 at its inner end carries a diagonal rod 46, that overrides a trip wire 47. Trip wire 47 is secured to shaft 47''' by solder or a similar process. This is clearly shown in FIGURES 6, 7 and 8. Reset wire 47' has an extension 47'' bent at a right angle to engage the underside of pawl 38, clearly shown in FIGURES 6 and 8. Reset wire 47' rests upon shoulder 48 of the depending arm 49.

The assembly of trip wire 47 and reset wire 47' to shaft 47''' forms a lever with shaft 47''' to rotate and swing extension 47'' of reset wire 47' upwardly to engage the lower side of pawl 38 and lift pawls 37 and 38 upwardly. Reset wire 47' engages shoulder 48 carried by a depending arm 49 in a holding position. This action will disengage pawls 37 and 38 from teeth 34' releasing the dial 34 to rotate counterclockwise, by means of spring 36, to the position shown in FIGURE 6.

The depending arm 49 is pivotally supported at 50 through a rib 51 that is molded integral with the housing 30. Arm 49 is biased in a forward direction by spring 52.

In FIGURE 6, the position of pawls 37 and 38 and stop pin 34'' shows the disc 34 out of calibration. To calibrate to 0 setting, a reset button 53 is mounted on pushrod 70 as shown in FIGURES 3 and 12. Coil spring 71 and trip wire 72 are connected at opposite end of rod 70. When button 53 is pushed inwardly it will move trip wire 72 against the lower extension of depending arm 49 thus permitting arm 49 to pivot about pin 50 releasing the reset wire 47' from the shoulder 48 as clearly shown in FIGURE 11. Reset wire 47' and trip wire 47 are rotated to a position shown in FIGURES 9 and 11 by means of a spring 47'''' which is wound about shaft 47''' with one end secured to reset wire 47' and opposite end resting on surface of rib 51. Pawls 37 and 38 drop downwardly. Pawl 38 will rest on teeth 34' and the end of pawl 37 will act as a stop for pin 34'' as it moves counter-clockwise thus setting the calibration on disc 34 at 0 reading, as shown in FIGURE 9.

Referring to FIGURES 3, 4, 6, 13, 14 and 15, plate 26 is welded to shaft 27. Extending from plate 26 are plates 26'. The lower section 26'' is bell mouthed for clearance. Upper ends 26''' of plate 26' are bent inwardly to form a snug fit engagement with crank arm 25. Referring to FIGURES 3 and 4, flat portion 22' of shaft 22 is keyed to weighing tray 15 by means of a slotted boss extending from the side of tray 15. Now, when the tray 15 is actuated by the milk filling the end portion 16, the weighted ball 20 will roll to the left as shown in FIGURE 13 dumping the milk. This action will pivot shaft 22, rotating arm 25, moving plate 26, rotating shaft 27 and rotating cam 41 which is keyed to shaft 27 by means of a set screw shown in FIGURE 3. Cam 41 engages cam roller 40'' actuating arm 40', pivoting shaft 40, swinging rocker arm 39 counter-clockwise, moving pawl 37 forward into a holding position and sliding the end of pawl 38 to the left and dropping it into ratchet tooth 34' as shown in FIGURE 13.

This action has placed pawl 38 into a position to advance disc 34 one tooth when right end portion 16' of tray 15 is filled with milk and dumped. FIGURE 14 shows end portion 16' of tray 15 rotating to dump. As tray 15 rotates it swings cam 41 clockwise permitting a connecting spring between pawls 37 and 38 to advance pawl 38 to the right, rotating disc 34 clockwise and moving the calibration of 12 ounces shown in FIGURE 13 to a calibrated position of one pound shown in FIGURE 15. The angular positions of tray 15 are controlled when the edges of plate 26 engage the surface of pins 31.

It will be apparent from the foregoing that novel means will be employed to accurately weigh milk from a weighing machine that is gravity actuated, embodies a free novel weighing tray that is overbalanced by a rolling steel ball and as the tray oscillates, it serves to actuate counter mechanism within a plastic housing and to control the movement of a circular disc within the housing and with the disc being provided with teeth upon its marginal edge that is engaged by pawls and with the disc being graduated adjacent its marginal edge. The device is foolproof, is strong, durable, and so constructed that it is impossible to alter the mechanism beyond the normal weight count.

It is to be understood, that the invention is not limited to the precise construction shown, but that changes are contemplated as readily fall within the spirit of the invention or scope of the subjoined claims.

I claim:

1. A milk weighing machine including in combination, a milk receiving bowl having an inlet opening at its top and an outlet opening at its bottom, a rockable dump pan in the bowl having two weighing chambers open at the top and separated from each other by a partition, fulcrum means supporting said dump pan for rocking motion, a temporary storage receptacle for milk supported in said bowl above said dump pan to accommodate an initial surge of milk flowing into said bowl, said receptacle having means for discharging milk into said dump pan at a controlled rate, said discharge means and said dump pan being positioned relative to each other so that milk flows into an upper one of said chambers when said pan is tilted to one side and flows into the other of said chambers when said pan is tilted to the other side, the milk being dumped into the bowl from the lower chamber not being filled as a result of the tilting of the pan, an elongated cylindrical closed passage supported by said dump pan and extending on opposite sides of said fulcrum means, a ball of predetermined weight in said passage and rollable therein from one side of said fulcrum means to the other to bias said pan so that said pan will not be rocked by milk flowing into the upper chamber until said ball is over-balanced, after which said pan rocks and said ball rolls to the other side of said fulcrum means, said receptacle and said pan and said bowl being constructed to facilitate cleaning thereof for meeting of sanitary standards, registering means housed completely separately from said bowl to facilitate said cleaning of said bowl without affecting said registering means, said registering means being adapted to register the increments of weight measured by said dump pan as milk continues to flow into said bowl, and means operatively connecting said registering means to said pan.

2. The milk weighing machine as claimed in claim 1 in which said registering means includes a pawl and ratchet mechanism driving a graduated member, and said interconnecting means includes a cam follower connected to said pawl and ratchet mechanism, a cam for reciprocating said cam follower, and shaft means connected to said cam and to said pan for transmitting the rocking motion of said pan to said cam.

3. The milk weighing machine as claimed in claim 1 in which said registering means includes a mechanical counter, a pressure cylinder for pulsing said counter, a valve connected to said cylinder by first and second lines, a two-way spool for said valve for alternately transmitting pressure through said lines to said cylinder to operate the same, and a shaft connected between said spool and said pan for operating said spool in response to the rocking of said pan.

4. The milk weighing machine as claimed in claim 1 in which said registering means includes a counter, first electrical coil actuator means for operating said counter, and second electrical coil actuator means operated by said dump pan, and said interconnecting means comprises circuit means including a source of energy connected to said first and second coil actuator means for transmitting electrical impulses between the same to advance said counter for each of the rocking motions of said pan.

5. A milk weighing machine including in combination, a milk receiving bowl having an inlet opening at its top and an outlet opening at its bottom, a rockable dump pan in the bowl having two weighing chambers open at the top and separated from each other by a partition, fulcrum means supporting said dump pan for rocking motion, said dump pan being positioned so that milk flows into an upper one of said chambers when said pan is tilted to one side and flows into the other of said chambers when said pan is tilted to the other side, the milk being dumped into the bowl from the lower chamber not being filled as a result of the tilting of the pan, an elongated cylindrical closed passage supported by said dump pan and extending on opposite sides of said fulcrum means, a ball of predetermined weight in said passage and rollable therein from one side of said fulcrum means to the other to bias said pan so that said pan will not be rocked by milk flowing into the upper chamber until said ball is overbalanced, a housing detachably affixed to said bowl, a disc journaled in the housing having ratchet teeth at the marginal edge thereof, pawls in the housing in overlying relation to said teeth, a cam in the housing movable in a back and forth manner every time the pan has been filled and dumped, cam follower means operatively connecting said cam to said pawls to control the movement of said pawls to thereby rotate said disc, said disc having indicia visible outside said housing for indicating the accumulated weight, a first shaft connected to said cam and projecting from said housing, said shaft having plate means thereon outside said housing, a second shaft rotated by said pan and engageable with said plate means to move the same for rotating said first shaft, means limiting the motion of said plate means, means biasing said disc, and means for resetting said disc.

6. A milk weighing machine as claimed in claim 5 in which said resetting means includes lever means for lifting said pawls out of engagement with said teeth, and depressible button means outside said housing connected operatively to said lever means.

7. A milk weighing machine as claimed in claim 6 further including zeroing means cooperating with said lever means for re-engaging said pawls with said teeth with said disc at a zero reading, and second depressible button means outside said housing operatively connected to said zeroing means for actuating the same.

References Cited

UNITED STATES PATENTS

| 1,351,284 | 8/1920 | Cawsey | 177—24 X |
| 1,143,109 | 6/1915 | Downey | 177—24 X |
| 1,125,176 | 1/1915 | Reynolds | 177—24 |
| 766,535 | 8/1904 | Sharp | 177—24 |
| 27,118 | 2/1860 | Farrar | 177—24 X |

STEPHEN J. TOMSKY, *Primary Examiner.*

G. H. MILLER, JR., *Assistant Examiner.*